United States Patent

Castelli et al.

(10) Patent No.: US 9,609,978 B2
(45) Date of Patent: Apr. 4, 2017

(54) JUG FOR THE PREPARATION OF BEVERAGES AND BEVERAGE PRODUCING SYSTEM

(71) Applicant: KONINKLIJKE PHILIPS N.V., Eindhoven (NL)

(72) Inventors: Cristiano Castelli, Eindhoven (NL); Filippo Agostini, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/648,383

(22) PCT Filed: Nov. 14, 2013

(86) PCT No.: PCT/IB2013/060121
§ 371 (c)(1),
(2) Date: May 29, 2015

(87) PCT Pub. No.: WO2014/087280
PCT Pub. Date: Jun. 12, 2014

(65) Prior Publication Data
US 2015/0297020 A1 Oct. 22, 2015

Related U.S. Application Data

(60) Provisional application No. 61/733,011, filed on Dec. 4, 2012.

(51) Int. Cl.
*A47J 31/40* (2006.01)
*A47J 31/44* (2006.01)
*A23C 3/02* (2006.01)

(52) U.S. Cl.
CPC ....... *A47J 31/4489* (2013.01); *A47J 31/4485* (2013.01)

(58) Field of Classification Search
CPC ............... A47J 31/4485; A47J 31/4489; B01F 2215/0006
(Continued)

(56) References Cited

U.S. PATENT DOCUMENTS

| 8,935,978 B2 * | 1/2015 | Balestier | A47J 31/4489 99/293 |
| 9,003,957 B2 * | 4/2015 | Pagano | A47J 31/4489 99/287 |

(Continued)

FOREIGN PATENT DOCUMENTS

| CA | 2709242 A1 | 1/2012 |
| DE | 202004006056 U1 | 7/2004 |

(Continued)

*Primary Examiner* — Dana Ross
*Assistant Examiner* — Lindsey C Staubach (57) ABSTRACT

A jug includes a body and a cover. The cover is provided with a steam inlet and supports a detachable stirrer. The stirrer is configured to rotate under an effect of a steam jet exiting a steam nozzle near a bottom of the body for impinging on the stirrer to cause rotation of the stirrer. The detachable stirrer extends from the cover towards the bottom of the body of the jug. The steam nozzle is further detachably connected to the cover and extends towards the bottom of the body of the jug and is positioned adjacent to the detachable stirrer. The steam nozzle and the detachable stirrer are connectable to and detachable from the cover one independently of the other.

15 Claims, 7 Drawing Sheets (58) Field of Classification Search
USPC .................... 99/287, 293, 323.1, 323.3, 453
See application file for complete search history.

(56) References Cited

U.S. PATENT DOCUMENTS

| | | | |
|---|---|---|---|
| 9,113,751 B2* | 8/2015 | Cocco ................. | A47J 31/3671 |
| 2005/0259508 A1 | 11/2005 | Rohde | |
| 2008/0008806 A1* | 1/2008 | Boussemart .......... | A47J 43/042 |
| | | | 426/519 |
| 2009/0266240 A1* | 10/2009 | Elissen ................ | A47J 27/004 |
| | | | 99/323.3 |
| 2012/0000372 A1 | 1/2012 | Vanni | |
| 2013/0000490 A1* | 1/2013 | De'Longhi ......... | A47J 43/0465 |
| | | | 99/323.1 |
| 2013/0239819 A1* | 9/2013 | Giua ................... | A47J 31/4489 |
| | | | 99/291 |

FOREIGN PATENT DOCUMENTS

| | | |
|---|---|---|
| EP | 2198762 A1 | 6/2010 |
| JP | 59156420 A | 9/1984 |
| WO | 2006136268 A1 | 12/2006 |
| WO | 2011104345 A1 | 9/2011 |
| WO | 2011113700 A1 | 9/2011 |
| WO | 2012209047 A1 | 3/2012 |
| WO | 2012069991 A1 | 5/2012 |

* cited by examiner

JUG FOR THE PREPARATION OF BEVERAGES AND BEVERAGE PRODUCING SYSTEM

This application is the U.S. National Phase application under 35 U.S.C. §371 of International Application No. PCT/IB2013/060121, filed on Nov. 14, 2013, which claims the benefit of U.S. Provisional Application No. 61/733,011 filed on Dec. 4, 2012. These applications are hereby incorporated by reference herein.

TECHNICAL FIELD

The present invention concerns improvements in beverage producing machines. In particular, the present invention concerns a new jug for the preparation of beverages, for example instant beverages, as well as a system comprising a beverage producing machine and a jug.

BACKGROUND ART

Modern beverage producing machines, for example coffee producing machines, are provided with a steam generator and a steam dispensing nozzle for dispensing steam in a jug, which is used for example for the production of frothed or hot milk. In some known devices a jug is provided, which is used for the preparation of instant beverages, i.e. beverages obtained by dissolving, diluting or mixing ingredients in powdery form in a liquid, such as e.g. hot or cold water, milk or the like.

WO 2011/113700 discloses a coffee producing machine equipped with a jug provided with a stirrer for mixing ingredients in a liquid contained in the jug. Steam is used to heat the beverage and a magnetic rotor is used to drive the stirrer into rotation.

WO 2006/136268 discloses several embodiments of jugs to be combined with a coffee producing machine and designed for the production of different kinds of beverages. In some embodiments a stirrer is provided on board of the jug and is mechanically driven into rotation by a motor housed in the coffee producing machine. In other embodiments steam is used as a source of energy to drive the stirrer into rotation.

The known jugs and devices for the production of beverages have some limitations, especially as far as the flexibility of use is concerned.

SUMMARY OF THE INVENTION

According to the invention, a jug for the preparation of hot beverages is provided, comprising a body and a cover, the cover being provided with a steam inlet and supporting a detachable stirrer designed and configured for rotation under the effect of a steam jet. The detachable stirrer extends from said cover of the jug towards the bottom of the jug body. A steam nozzle is detachably connected to the cover and extends towards the bottom of the jug body and sideways of the detachable stirrer. A steam flow path is further provided, extending from the steam inlet to the steam nozzle, so that steam e.g. produced by a beverage preparing machine, can be delivered through the steam inlet, directly or indirectly, to the steam nozzle towards the bottom of the jug body. The detachable steam nozzle and the detachable stirrer are connectable to and detachable from the cover one independently of the other. With this arrangement a particularly simple and flexible jug is provided, which can be used for either heating, or stirring, or heating and stirring a beverage. For example, the stirrer can be removed and only the steam nozzle can be used to deliver hot steam in a beverage for heating purposes. Alternatively, both the stirrer and the steam nozzle can be attached to the cover of the jug, to produce a beverage by heating and stirring one or more ingredients, e.g. to prepare a beverage using soluble ingredients in powder or granulate form. In some embodiments, when the steam nozzle is removed the stirrer can still be rotated, providing additional flexibility for the jug.

Arranging the stirrer and the steam nozzle as separate detachable components gives further advantages. The rotary shaft of the stirrer is not encapsulated in the steam nozzle. A simpler construction is obtained, which is also easier to clean. In prior art devices, where the rotary shaft of the stirrer extends coaxial with the steam nozzle, residues of the beverage ingredients can penetrate in the space between the stirrer shaft and the inner wall of the steam nozzle. This are is difficult to clean and residues can solidify therein, leading to health risks, for instance in case of residues which can deteriorate and cause microorganism proliferation. In addition to cleaning problems, residues of beverage ingredients can cause blocking of the stirrer shaft. A steam nozzle arranged approximately parallel to but not coaxial with the rotary shaft of the stirrer overcomes these drawbacks.

In some advantageous embodiments the stirrer can comprise a shaft rotatably supported at a proximal end on the cover and provided with an agitator arranged adjacent a distal end of the shaft. The steam nozzle can be provided with an outlet aperture at the end thereof, near the agitator. Steam exiting the steam nozzle can thus heat the liquid in the jug and at the same time drive the stirrer into rotation. If the stirrer is removed, just heating is obtained. In some embodiments the steam nozzle can be directly connected to the steam inlet, e.g. through a pipe or tube.

Preferably the shaft and the steam nozzle extend approximately parallel to one another.

In some embodiments the agitator of the stirrer can comprise a plurality of blades or similarly shaped members, acting both as a turbine to receive driving power from the steam and as a stirrer member, transferring kinetic energy to the liquid contained in the jug.

The outlet aperture of the steam nozzle can be orientable towards the agitator, so that steam exiting said steam nozzle acts on the agitator driving it into rotation.

In other embodiments the jug comprises a turbine connected to the shaft of the stirrer for rotation therewith. The turbine is advantageously arranged in an intermediate position in the steam flow path between the steam inlet provided on the jug cover and the steam nozzle. In this case the steam nozzle is indirectly connected to the steam inlet, e.g. through a housing where the turbine is rotatably arranged. The connection between the turbine and the shaft can be reversible, i.e. the turbine and the shaft can be connected to one another and disconnected from one another, e.g. for cleaning purposes. In some embodiments, the turbine can be designed and configured to stably remaining in the jug cover, while the shaft is removed therefrom for easy cleaning.

In this manner, steam from the steam inlet drives the turbine into rotation before flowing towards and through the steam nozzle and exiting the steam nozzle to heat the liquid contained in the jug.

According to some embodiments, the turbine is rotatably supported in a housing provided in the cover of the jug. The housing can be in fluid communication with the steam inlet, e.g. via a pipe, tube or hose housed in the jug cover. The pipe, tube or hose can be provided with an exit arranged in a suitably oriented position with respect to the turbine, e.g.

approximately tangential to the turbine, to optimize the thrust applied by the flowing steam on the turbine. The housing can be further in fluid communication with the steam nozzle, so that steam entering the steam inlet flows through the housing driving the turbine and the stirrer into rotation and therefrom in the steam nozzle.

The invention further concerns a system comprising a jug as described above as well as a beverage preparing machine, e.g. a coffee machine or the like. The beverage preparing machine comprises a steam generator and a steam dispensing nozzle in fluid communication with the steam generator. The steam dispensing nozzle is arranged and designed to be fluidly connected to the steam inlet of the jug, so that steam produced by the steam generator can be delivered in the jug.

Further features and advantages of the invention are set forth in the following description of exemplary embodiments thereof and in the enclosed claims, which form an integral part of the present description.

BRIEF DESCRIPTION OF THE DRAWINGS

A more complete appreciation of the invention and many of the advantages thereof will be readily obtained as the same becomes better understood by reference to the following detailed description when considered in connection with the accompanying drawings, which show one exemplary non-limiting embodiment of the invention. In the drawings.

DESCRIPTION OF EMBODIMENTS OF THE INVENTION

The following detailed description of exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

A first embodiment of a jug according to the invention is illustrated in FIGS. 1 to 4. The jug is labeled 1 as a whole. The jug 1 includes a body 3 and a cover 5. In this embodiment the body 3 is provided with a handle 7 formed as a single molded piece with the body 3. In other embodiments the jug 1 could be devoid of any handle or a handle can be attached as a separate component to the body 3.

In some embodiments the jug 1 is provided with a pouring lip 9. In the embodiment of FIGS. 1 to 4 the pouring lip 9 is provided on the side of the jug 1 opposite the handle 7.

The cover 5 is comprised of a first, lower cover portion 5A and a second, upper cover portion 5B which can be combined one to the other in a detachable manner, for example in order to clean the components housed inside the cover 5 and which will be disclosed in more detail later on.

The cover portion 5A can be provided with sealing arrangements 11 for closing the body 3 of the jug 1. In the embodiment illustrated in the drawings the upper cover portion 5B supports a nose 13 in which a steam inlet 15 is arranged. The steam inlet 15 can be formed in a block 17, for example made of molded plastic, housed in a seat 19 provided in the nose 13 of the jug 1. The block 17 can be removable from the seat 19 and a closing member 21 can be provided for locking the block 17 in the seat 19 formed by the upper cover portion 5B.

Figures 1, 2:
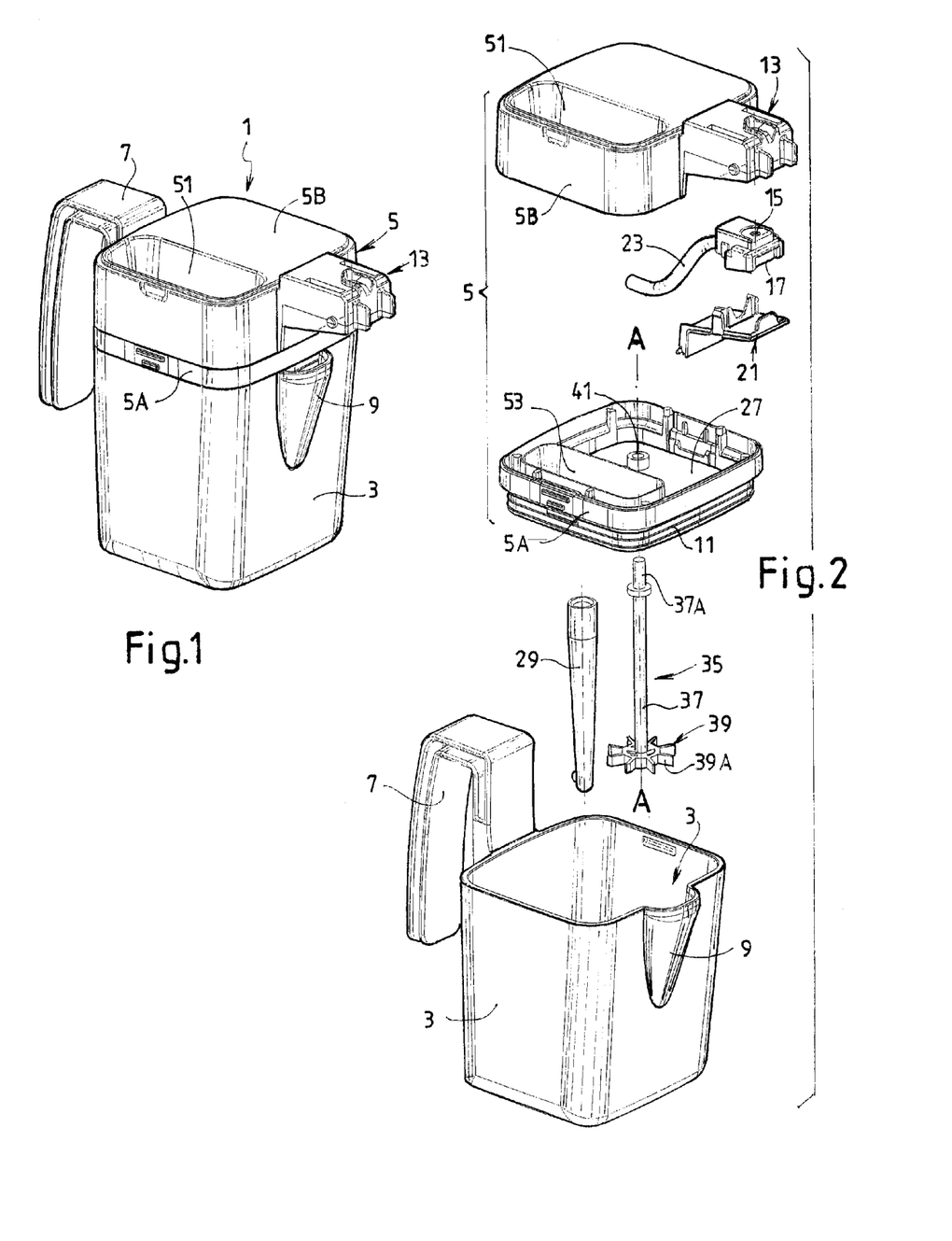
FIG. 1 illustrates a perspective view of a jug in a first embodiment.
FIG. 2 illustrates an exploded view of the jug of FIG. 1.

The steam inlet 15 is in fluid communication with a tube 23 extending from the block 17 towards a connector 25 housed in the cover 5.

In some embodiments the connector 25 projects from a bottom wall 27 of the lower cover portion 5A and forms a pipe fitting 25A. A steam nozzle 29 can be removably connected to the pipe fitting 25A and removed therefrom. A sealing, such as an O-ring 31 is possibly provided around the pipe fitting 25A.

Figure 4:
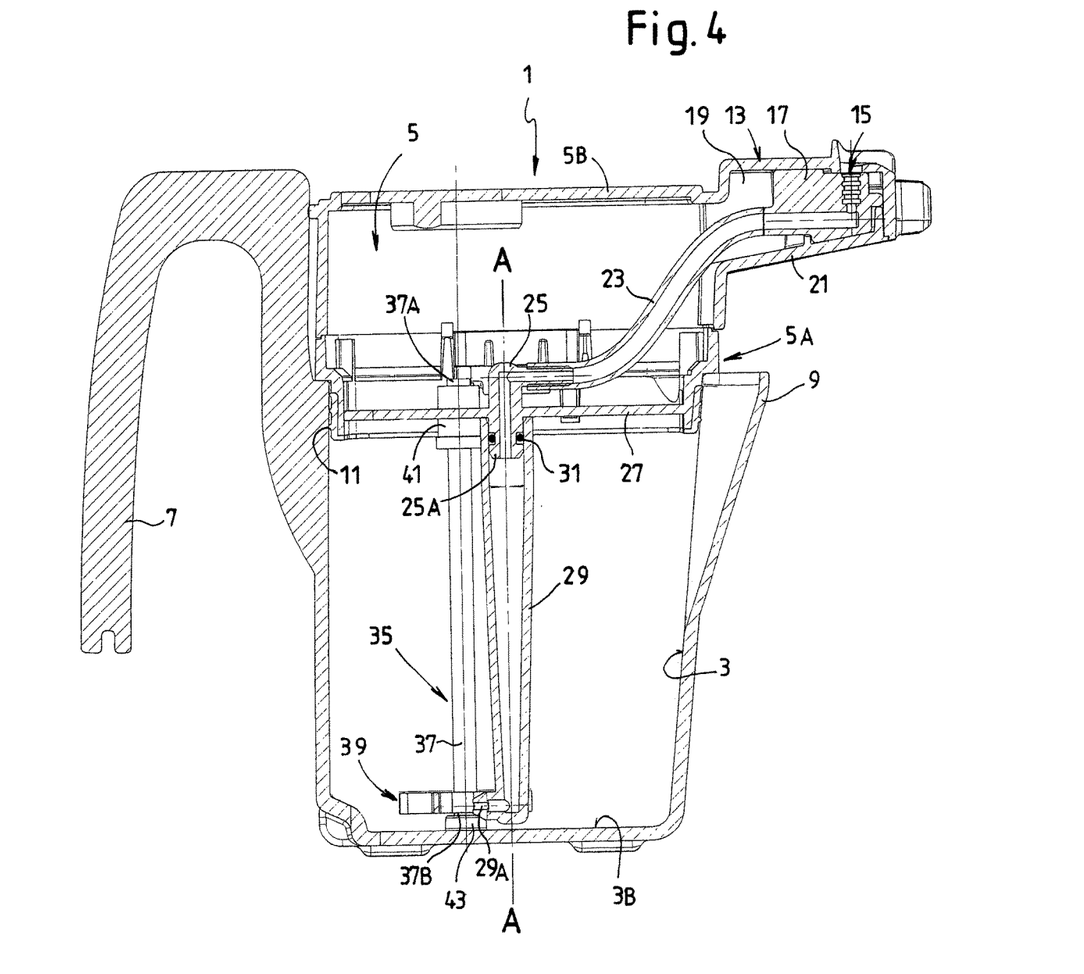
FIG. 4 illustrates a section according to line IV-IV of FIG. 3.

When the jug and the cover are mounted, the steam nozzle 29 projects from the bottom wall 27 of the cover 5 towards the bottom 3B of the body 3 of the jug 1. Preferably, as can be seen in FIG. 4, the length of the steam nozzle 29 is such that it extends almost to the bottom 3B of the body 3, leaving a small distance, for example some millimeters, between the tip of the steam nozzle 29 and the bottom 3B.

In the embodiment illustrated in the drawings, the steam nozzle 29 has an outlet aperture 29A which can be oriented substantially parallel to the bottom 3B of the body 3. In some embodiments the outlet aperture 29A is provided near the or at the end of the downwardly extending steam nozzle 29 and is inclined at about 90° with respect to the axis of the downwardly extending steam nozzle portion 29 which is in turn approximately orthogonal to the bottom wall 27 of the cover 5.

Steam entering through the steam inlet 15 can thus flow through the tube 23 into and through the steam nozzle 29 and flow out of the nozzle through aperture 29A near the bottom 3B of the jug 1.

A stirrer 35 can be removably connected to the cover 5 of the jug 1. The stirrer 35 can be comprised of a stirrer shaft 37 having a proximal end 37A and a distal end 37B. Near the distal end 37B an agitator 39 is rotatably connected to the shaft 37. In some embodiments the agitator can be removably fitted to the stirrer shaft. In other embodiments, the stirrer shaft and the agitator can be irreversibly connected one to the other.

In some embodiments the agitator 39 comprises a plurality of radially extending blades 39A forming a sort of turbine. The proximal end 37A of the shaft 37, i.e. the end near to the cover 5 of the jug 1, is idly mounted in a rotary seat 41 provided in the cover 5 and formed for example by the lower part 5A of the cover 5.

The distal end 37B of the shaft 37, i.e. the end which is located at the bottom 3B of the jug body 3 when the jug 1 and the cover 5 are assembled (FIG. 4), can be supported in a lower rotary seat 43 molded in the bottom 3B of the body 3 of the jug 1.

With this arrangement the stirrer 35 can idly rotate around the axis A-A (FIGS. 2 and 4) under the thrust of a steam jet as explained later on.

Figure 3:
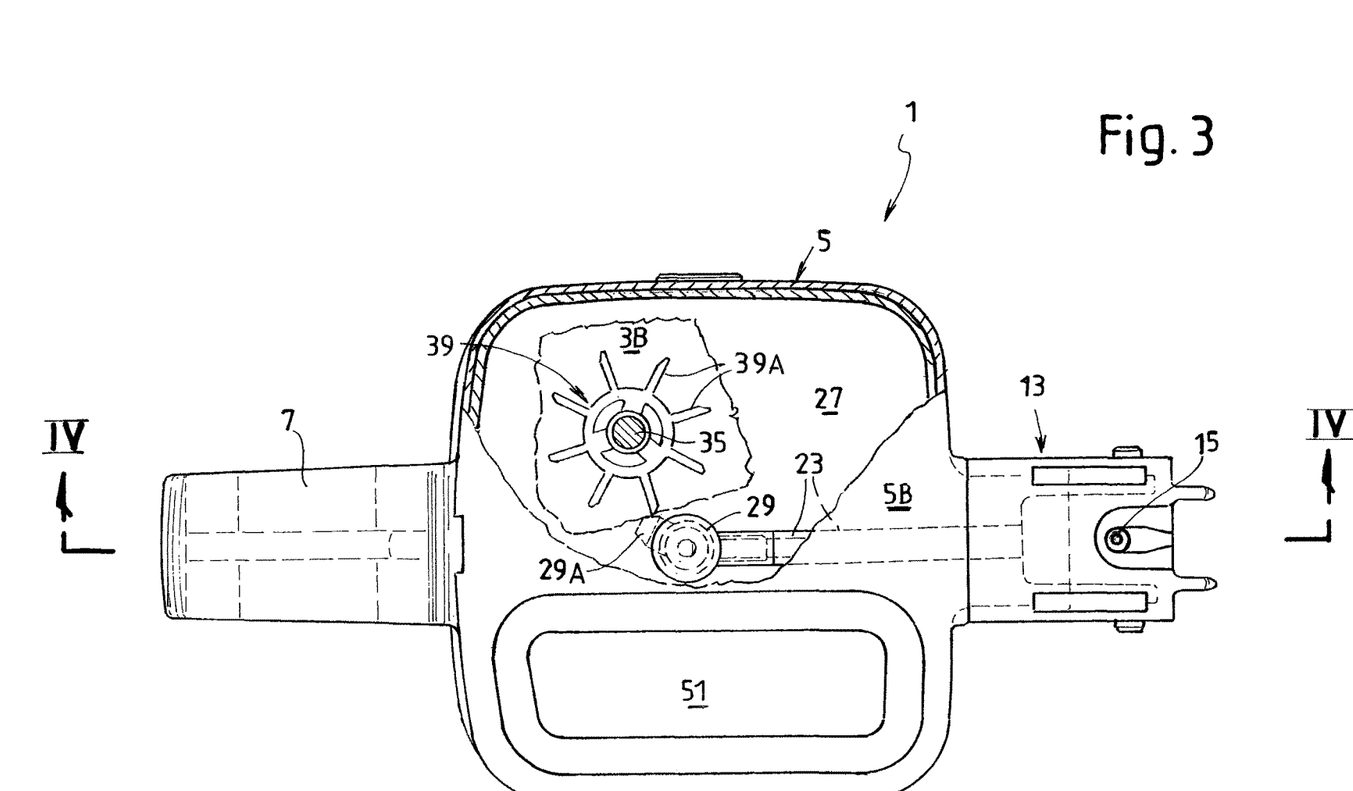
FIG. 3 illustrates a top view with removed portions of the jug of FIGS. 1 and 2.

As can be best appreciated looking at FIG. 3, the steam outlet aperture 29A of the steam nozzle 29 is oriented so that the steam jet generated by the steam nozzle 29 is oriented against the blades 39A of the stirrer 39. By dispensing steam into the steam inlet 15, a steam jet is generated, which drives into rotation the stirrer 35. Since both the agitator 39 of the stirrer 35 and the steam outlet aperture 29A are arranged near the bottom 3B of the body 3 of the jug 1, when both the stirrer 35 and the steam nozzle 29 are attached to the cover 5 of the jug 1, a liquid product contained in the jug 1 will be stirred and heated at the same time. In this manner a hot beverage can be produced, for instance, starting from cold water and a solid ingredient, for example an ingredient in the form of powder or granules and which can be dissolved or suspended in the liquid with the aid of the steam jet and the mechanical action of the rotating stirrer 35 with the agitator 39.

The jug 1 can be provided with an aperture allowing the insertion of the liquid and/or the solid ingredients once the jug has been closed with the cover 5 seated on top of the body 3. In the embodiment illustrated in the drawings, for example, the upper portion 5B of the cover 5 is provided with a hopper 51 extending into a slot 53 formed in the lower portion 5A of the cover 5 and forming a through passage. The ingredients (both in solid, for example powdery form, as well as in liquid form) can be introduced through the hopper 51 and the through passage 53 into the body 3 of the jug 1 for the preparation of the beverage. Once the beverage has been prepared, it can be poured from the jug by means of the pouring lip 9.

Figure 9:
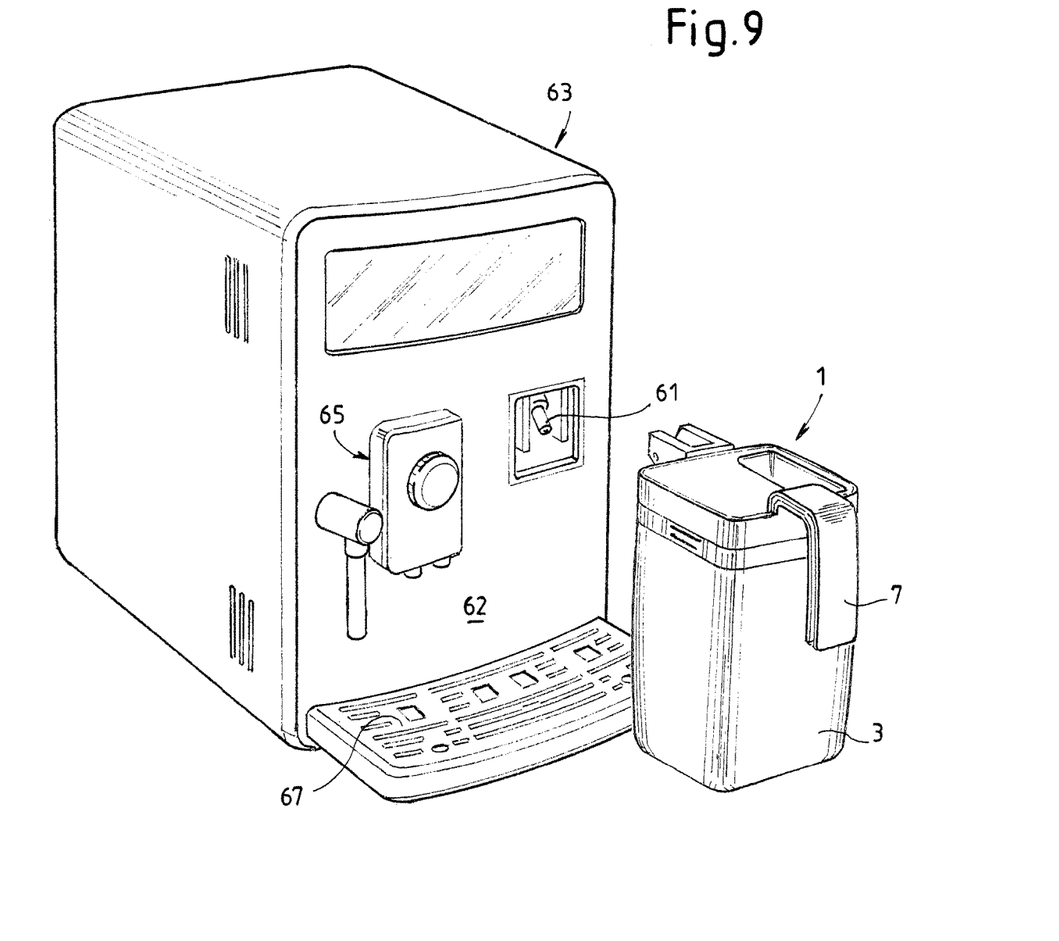
FIG. 9 schematically illustrates a beverage producing machine with a jug according to the invention.

FIG. 9 schematically illustrates how a jug 1 of this kind can be connected to a steam dispenser 61 provided for example on the front panel 62 of a beverage preparing machine 63, such as a coffee producing machine. In this example, the machine 63 is also provided with coffee dispensers 65 and with a drip tray 67 with a closing grid, on which a container such as a cup for collecting the beverage dispensed by the dispenser 65 can be placed.

FIGS. 5 to 8 illustrate a second embodiment of a jug according to the invention. In this embodiment the jug is labeled 101 as a whole and comprises a body 103, a cover 105 and a handle 107. Also in this embodiment the handle can be integrally molded with the body 103 or can be attached thereto as a separate component. In other embodiments, the handle can be dispensed with. If a handle is not provided, handling of the jug can be facilitated by side impressions formed in opposite lateral walls of the jug, for example.

In some embodiments the cover 105 is comprised of a lower cover portion 105A and upper cover portion 105B. Advantageously the upper cover portion 105B and the lower cover portion 105A can be reversibly connected to one another and separated from one another in order to clean the components housed inside the cover.

The upper cover portion 105B forms a pouring lip 109 through which the beverage prepared in the jug 101 can be poured. The pouring lip 109 can be arranged along an edge of a hopper 151 which can also be used for introducing the ingredients (either in solid or well in liquid form) into the jug 101, the hopper 151 being in communication with the through passage 153 formed in the lower cover portion 105A.

The upper cover portion 105B forms a nose 113 housing a steam inlet 115, which can be formed in a block 117. The block 117 can be retained within a housing 119 (FIG. 7) formed in the nose 113 of the upper cover portion 105B.

Figure 7:
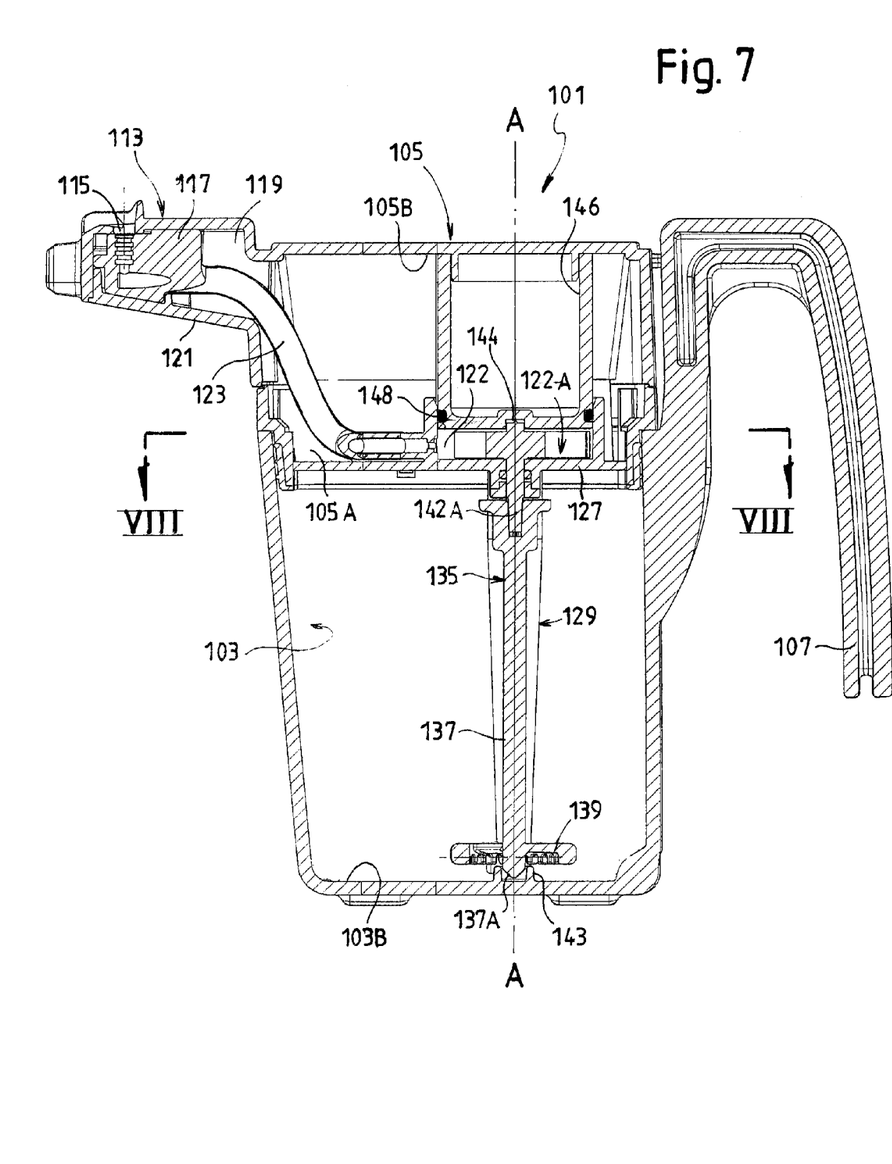
FIG. 7 illustrates a section according to line VII-VII in FIG. 5.

A component 121 can be snap-engaged with the upper portion of the nose 113 to retain the block 117 safely inside the housing 119.

A tube or pipe 123 provides a fluid connection between the steam inlet 115 and a housing 122 for a turbine, which will be disclosed later on, provided for driving into rotation a stirrer, which can be mounted in the jug.

In some embodiments the lower cover portion 105A is provided with a connector extending from the lower or bottom wall 127 of the lower cover portion 105A. A steam nozzle 129 can be detachably connected to said connector. The connector is shown schematically at 125 in the section of FIG. 8 and places the steam nozzle 129 in fluid communication with the housing 122.

When the jug is in the correct operating position the steam nozzle 129 extends downwardly from the bottom of the cover portion 105A towards the bottom 103B of the body 103 of the jug 101.

A turbine 142 is rotatably mounted in the housing 122. In the embodiment illustrated in the drawings (see in particular FIG. 7) the turbine 142 is supported for rotation by means of a spindle 142A projecting downwardly from the turbine 142 through the bottom wall 127 of the lower cover portion 105A. The spindle 142A projects from the bottom wall 127 towards the bottom 103B of body 103 of the jug 101.

The turbine 142 can be retained in the correct rotating position by providing a top seat 144 formed in a member 146 constrained (in a reversible or irreversible manner) to the top portion 105B of the cover 105. A seal, for example an O-ring 148, can be provided between the component 146 and the inner surface of the housing 122, which can be bounded by a substantially cylindrical wall 122A.

Figures 5, 6:
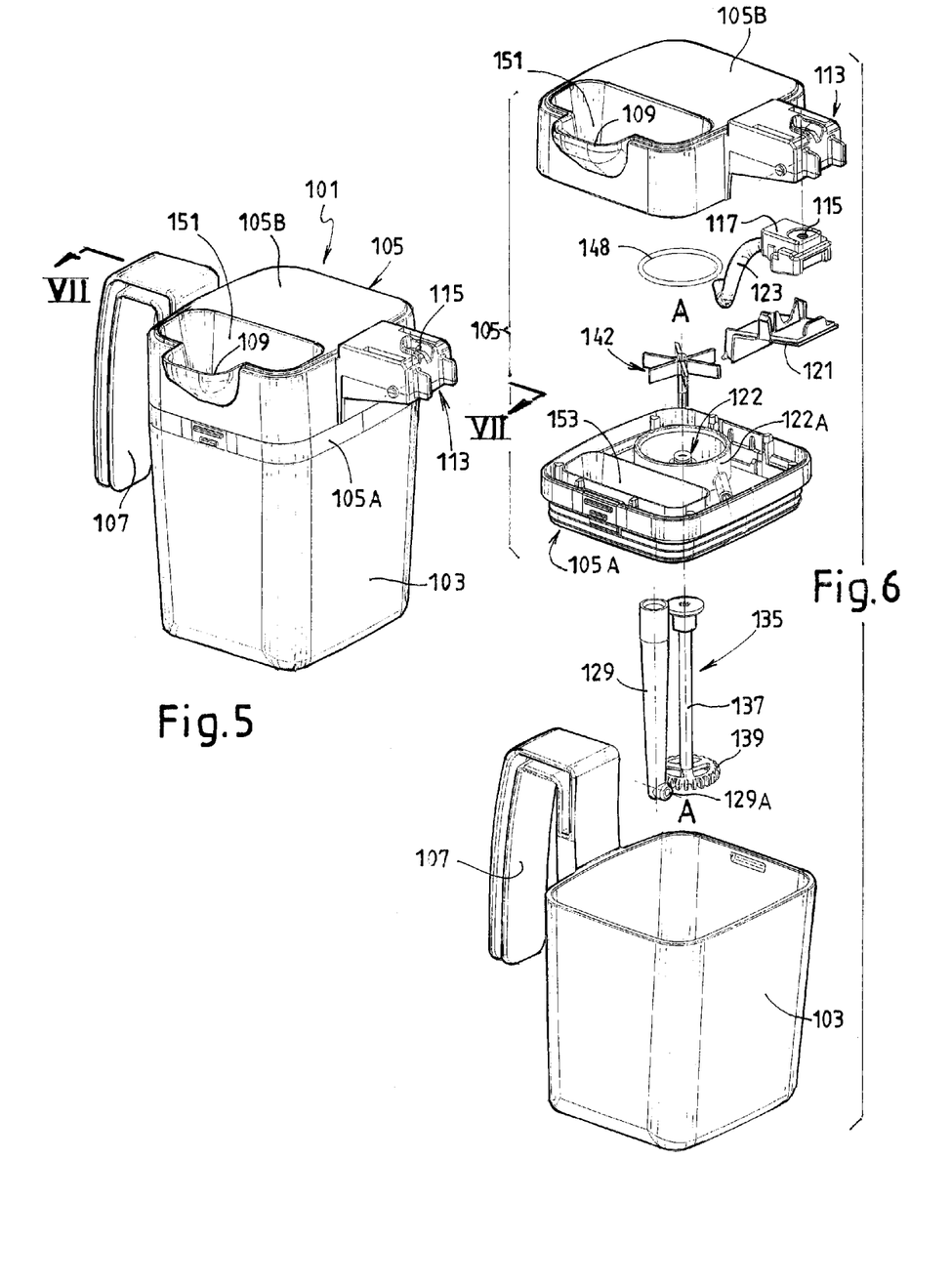
FIG. 5 illustrates a perspective view of a jug according to a second embodiment.
FIG. 6 illustrates an exploded view of the jug of FIG. 5.

With this arrangement the turbine 142 can idly rotate around an axis A-A (see in particular FIGS. 6 and 7).

Figure 8:
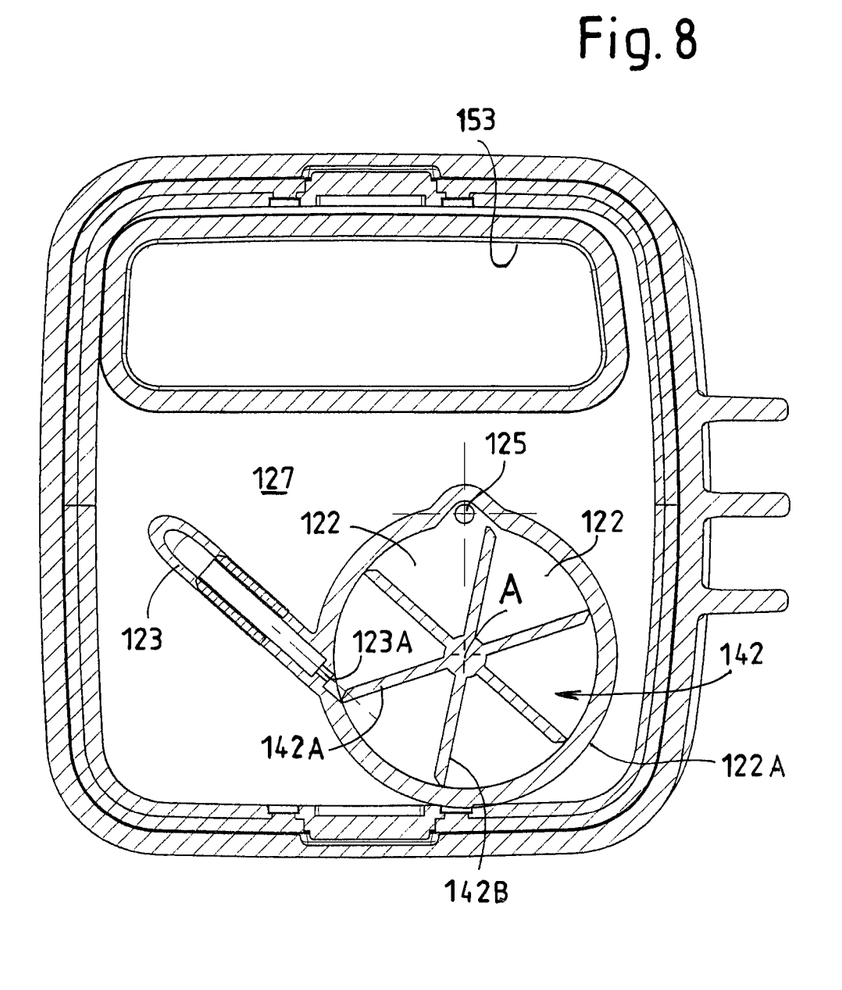
FIG. 8 illustrates a section according to line VIII-VIII in FIG. 7.

As can be appreciated in particular from FIG. 8, the tube 123 ends with an opening 123A into the housing 122 where the turbine 142 is rotatably housed. The turbine 142 is provided with blades 142B, for example radially extending blades 142B, which are oriented with respect to the outlet 123A of the tube 123, so that a steam jet generated through the outlet 123A will drive the turbine 142 into rotation.

The spindle 142A is rotatably connected to a stirrer 135. Connection between the spindle 142A and the stirrer 135 can be obtained for example with a suitable shape of the spindle 142A and of a corresponding seat provided in a proximal end of a shaft 137 of the stirrer 135.

The coupling between the spindle 142A and the shaft 137 of the stirrer 135 is such that the rotation of the turbine 142 will drive into rotation the stirrer 135. The latter is comprised of an agitator 139 which can be suitably arranged at or near the distal end 137A of the shaft 137. The agitator 139 can be suitably shaped, for example with a plurality of radially extending blades or the like.

The shape of the stirrer can be designed as a function of the kind of beverage to be produced. In some embodiments different stirrers with differently designed agitators can be used alternatively on the same jug. This also applies to the embodiment illustrated in FIGS. 1 to 4.

In some embodiments, as shown in FIG. 7, the distal end 137A of the shaft 137 can be engaged for rotation into a seat 143 provided on the bottom 103B of the body 103, e.g. integrally molded with the body 103 of the jug 101. In this manner the shaft 137 of the stirrer 135 is supported for rotation on the one side in the seat 143 and on the other side by the spindle 142B of the turbine 142.

When the jug 101 is connected to the beverage producing machine, in a manner similar to what has been described before with respect to FIG. 9, steam can be dispensed from the beverage producing machine into the steam inlet 115. The steam will then flow through the tube 123 into the housing 122 impinging against the blades 142B of the turbine 142. This will set the turbine 142 into rotation around axis A-A and the rotation of the turbine 142 will be transmitted via spindle 142A to the shaft 137 thus driving the agitator 139 into rotation.

The steam will then escape the housing 122 through the connector 125 and will be dispensed through aperture 129A of the steam nozzle 129 into the liquid contained in the jug 101.

With this arrangement steam can be dispensed through the steam inlet 115 to both heat and stir the ingredients contained in the jug 101.

If the steam nozzle 129 is removed, steam can be released from the housing 122 without heating the beverage. Cold beverages can in this case be obtained with the same jug using the stirrer only. Depending upon the structure of the beverage producing machine to which the jug is interfaced, air can be dispensed instead of steam, e.g. when a cold beverage is required. Air exiting the housing 122 and not conveyed through the steam nozzle 129 will escape in the environment without affecting the temperature of the beverage.

In the embodiments disclosed above, both the steam nozzle 129, 29 as well as the stirrer 135, 35 can be removed one independently of the other from the cover 105, 5. In this manner the user can select the way of using the jug with only the steam nozzle or with both the steam nozzle and the stirrer.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A jug for preparation of a hot beverage comprising: a body and a cover, the cover being provided with a steam inlet and supporting a stirrer, and the stirrer being detachably connected to the cover and configured to rotate under an effect of a steam jet exiting a steam nozzle near a bottom of the body for impinging on the stirrer to cause rotation of the stirrer, the bottom of the body being farther from the cover than a top of the body,
wherein the stirrer extends from the cover towards the bottom of the body of the jug,
wherein the steam nozzle is detachably connected to the cover and extends towards the bottom of the body of the jug and is positioned adjacent to the stirrer, and
wherein a steam flow path is provided between the steam inlet and the steam nozzle.

2. The jug according to claim 1, wherein the stirrer comprises a shaft rotatably supported at a proximal end on the cover and provided with an agitator arranged adjacent a distal end of the shaft near the bottom of the body opposite the proximal end, and wherein the steam nozzle has an outlet aperture at an end of the steam nozzle, near the agitator, for the exiting of the steam jet.

3. The jug according to claim 2, wherein the shaft and the steam nozzle extend parallel to one another.

4. The jug according to claim 2, wherein the agitator comprises a plurality of blades.

5. The jug according to claim 2, wherein the outlet aperture is orientable towards the agitator, and wherein the steam nozzle is configured to output steam for acting on the agitator to drive the agitator into rotation.

6. The jug according to claim 2, wherein the steam nozzle is fluidly connected through a tube with the steam inlet.

7. The jug according to claim 2, comprising a turbine configured to rotate along with the shaft, said turbine being arranged in the steam flow path between the steam inlet and the steam nozzle, wherein steam from the steam inlet drives the turbine and the shaft into rotation before flowing through the steam nozzle.

8. The jug according to claim 7, wherein the turbine is detachably connectable to and disconnectable from the shaft.

9. The jug according to claim 7, wherein the turbine is connected at the proximal end of the shaft.

10. The jug according to claim 7, wherein the turbine is rotatably supported in a housing provided in the cover of the jug, said housing being in fluid communication with the steam inlet and with the steam nozzle, and wherein steam entering the steam inlet flows in the steam nozzle through the housing, driving the turbine and the stirrer into rotation.

11. The jug according to claim 10, wherein the turbine includes a driving spindle, the driving spindle being rotatably supported on the cover and projecting from the housing towards the bottom of the body, and the driving spindle being torsionally connectable to and disconnectable from the stirrer.

12. The jug according to claim 1, wherein the steam nozzle and the stirrer are connectable to and detachable from the cover one independently of the other, wherein the jug is configured to operate with one of the stirrer and the steam nozzle connected to the cover.

13. A system comprising: a beverage preparing machine with a steam generator and a steam dispensing nozzle; and a jug for preparation of a hot beverage, the jug comprising: a body and a cover, the cover being provided with a steam inlet and supporting a stirrer, and the stirrer being detachably connected to the cover and configured to rotate under an effect of a steam jet exiting a steam nozzle near a bottom of the body for impinging on the stirrer to cause rotation of the stirrer, the bottom of the body being farther from the cover than a top of the body, wherein the stirrer extends from the cover towards the bottom of the body of the jug, wherein the steam nozzle is detachably connected to the cover and extends towards the bottom of the body of the jug and is positioned adjacent to the stirrer, wherein a steam flow path is provided between the steam inlet and the steam nozzle, and wherein the steam dispensing nozzle is configured to connect with the steam inlet of the jug.

14. The system according to claim 13, wherein the steam nozzle and the stirrer are connectable to and detachable from the cover one independently of the other, wherein the jug is configured to operate with one of the stirrer and the steam nozzle connected to the cover.

15. The system according to claim 13, wherein the shaft and the steam nozzle extend parallel to one another.

* * * * *